(No Model.) 6 Sheets—Sheet 1.
E. S. LENOX & L. COOK.
MACHINE FOR MAKING WIRE BALE TIES.
No. 362,452. Patented May 3, 1887.
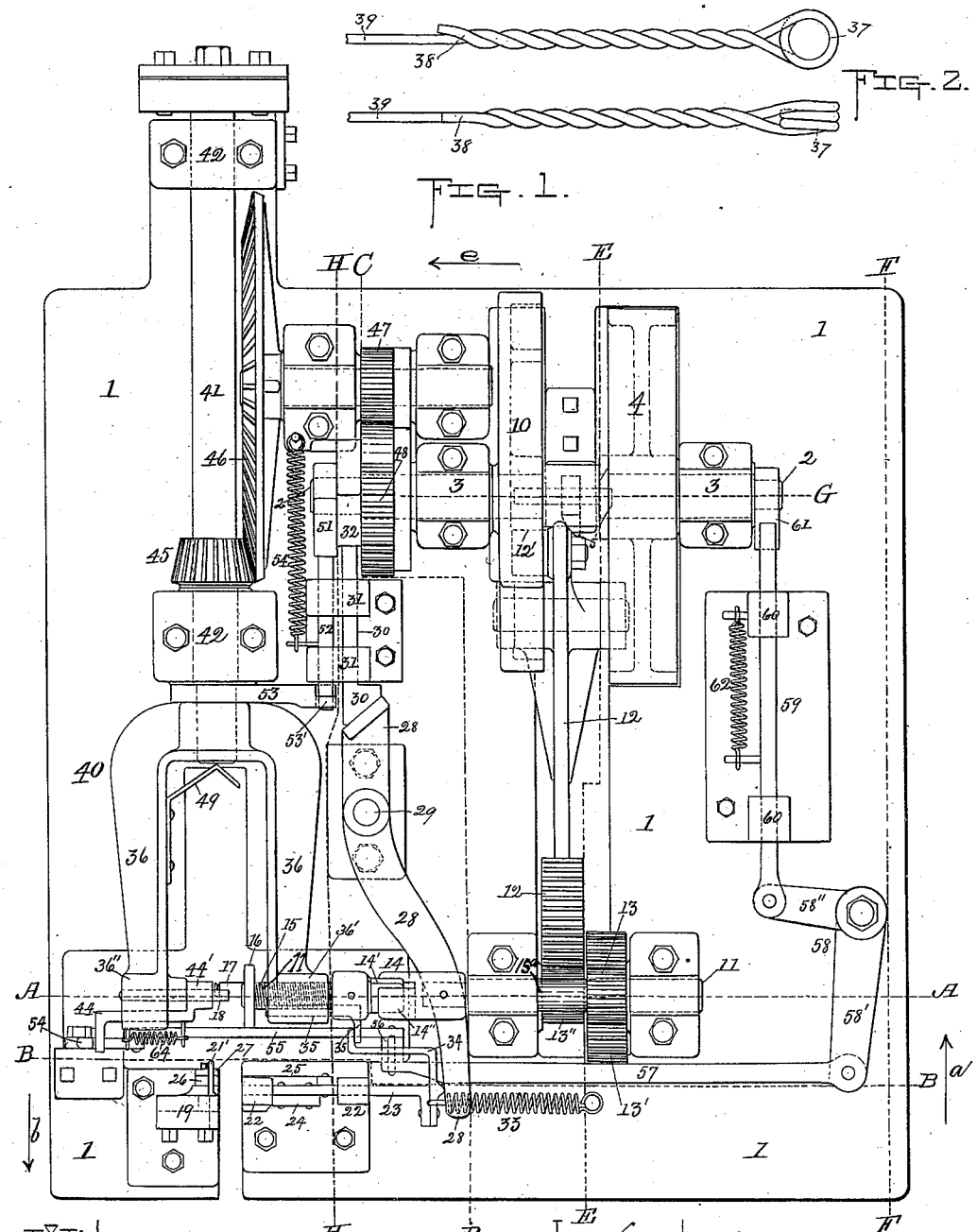

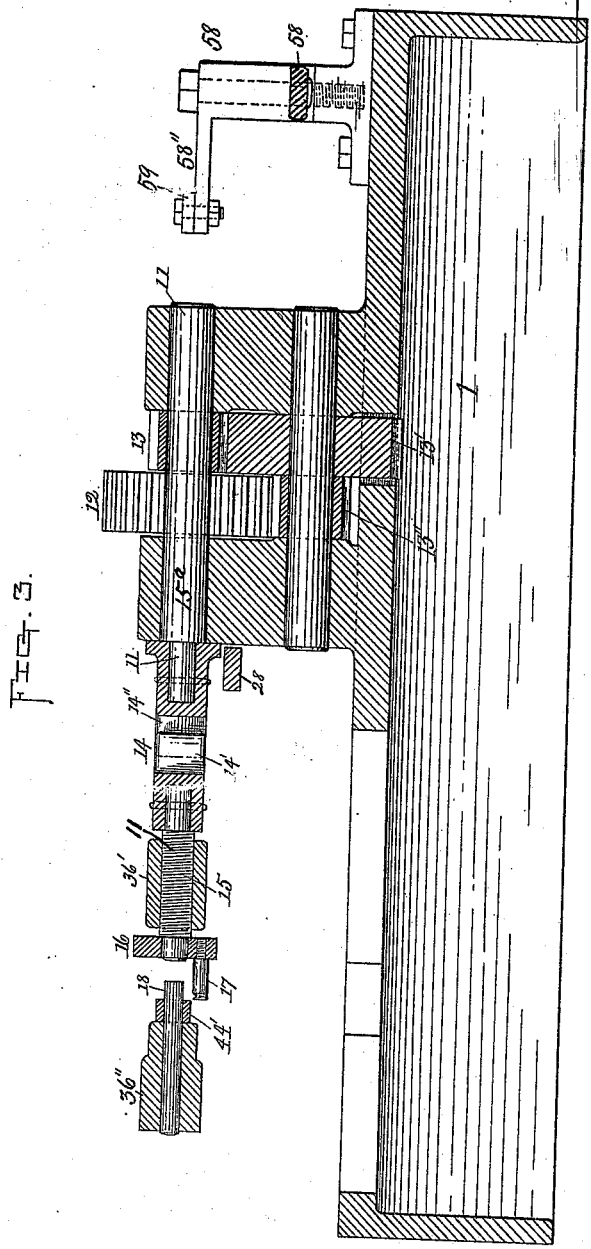

(No Model.)
E. S. LENOX & L. COOK.
MACHINE FOR MAKING WIRE BALE TIES.
No. 362,452. Patented May 3, 1887.
Fig. 4.
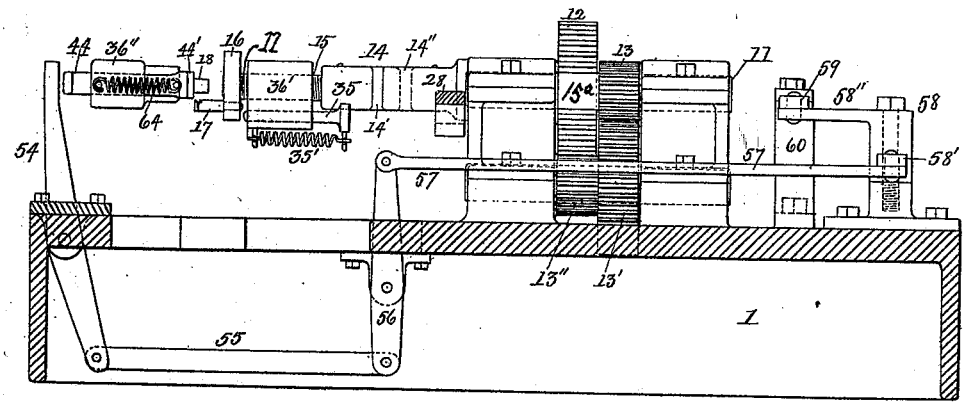
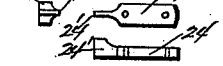
Fig. 5.
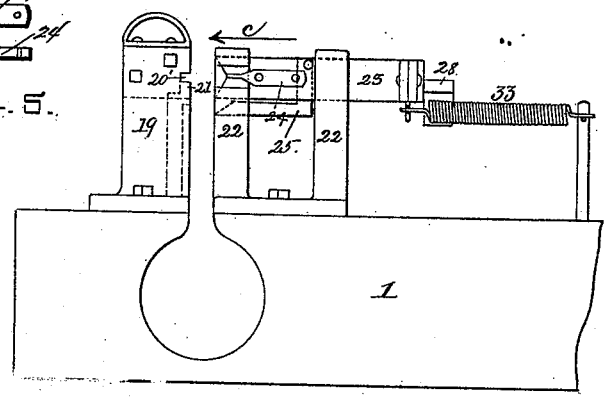
Witnesses:
Fred. W. Smith.
T. G. Kent
Inventors:
Edwin S. Lenox.
Leroy Cook
By John C. Dewey, Att'y.

(No Model.)
E. S. LENOX & L. COOK.
MACHINE FOR MAKING WIRE BALE TIES.
No. 362,452. Patented May 3, 1887.
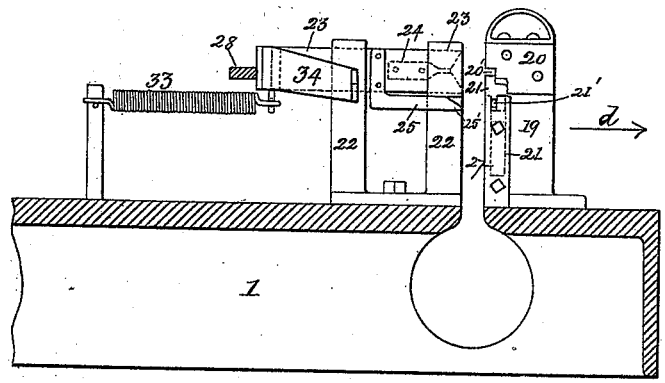
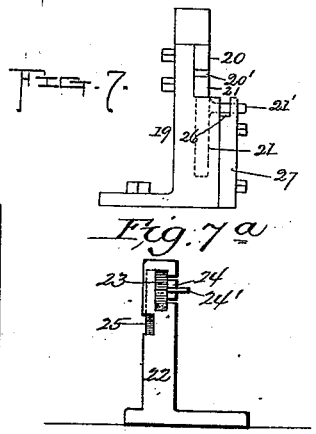
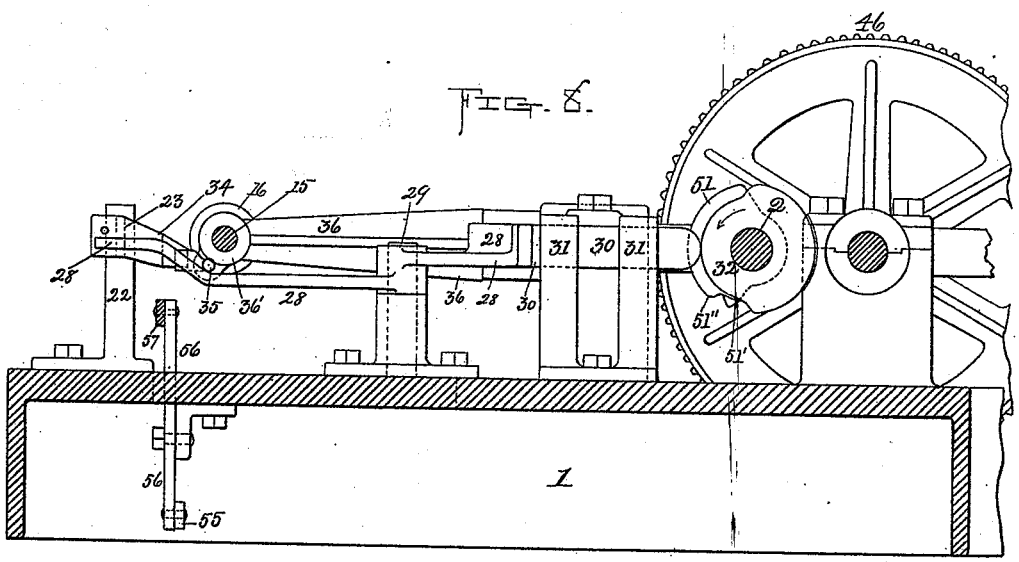
Witnesses:
Fred. W. Smith.
T. G. Kent
Inventors:
Edwin S. Lenox.
Leroy Cook.
By John C. Dewey, Att'y (No Model.)
E. S. LENOX & L. COOK.
MACHINE FOR MAKING WIRE BALE TIES.
No. 362,452.  Patented May 3, 1887.
6 Sheets—Sheet 5.
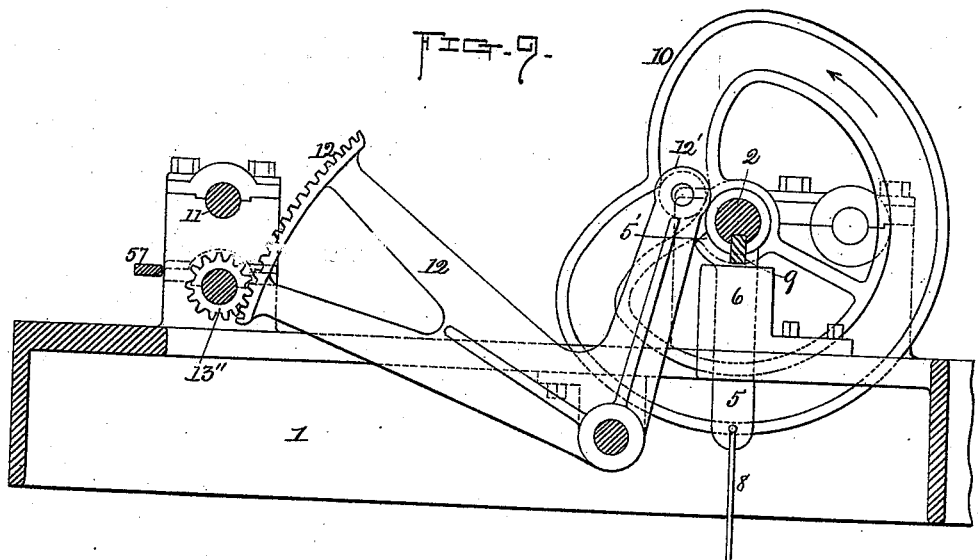
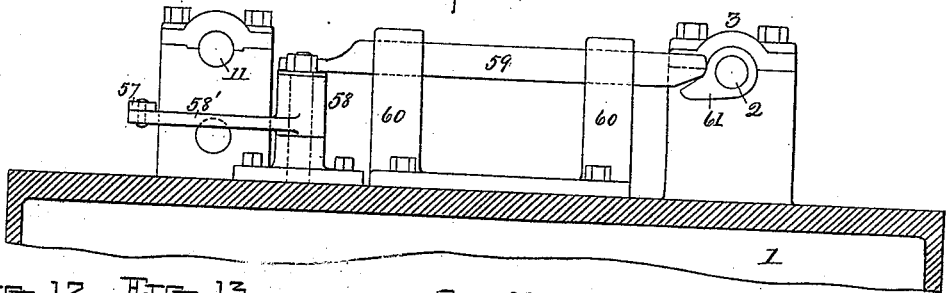
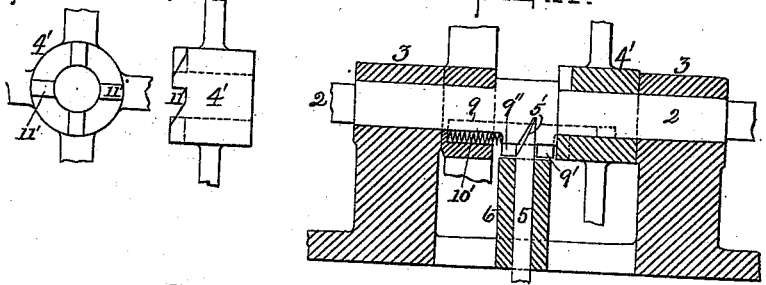

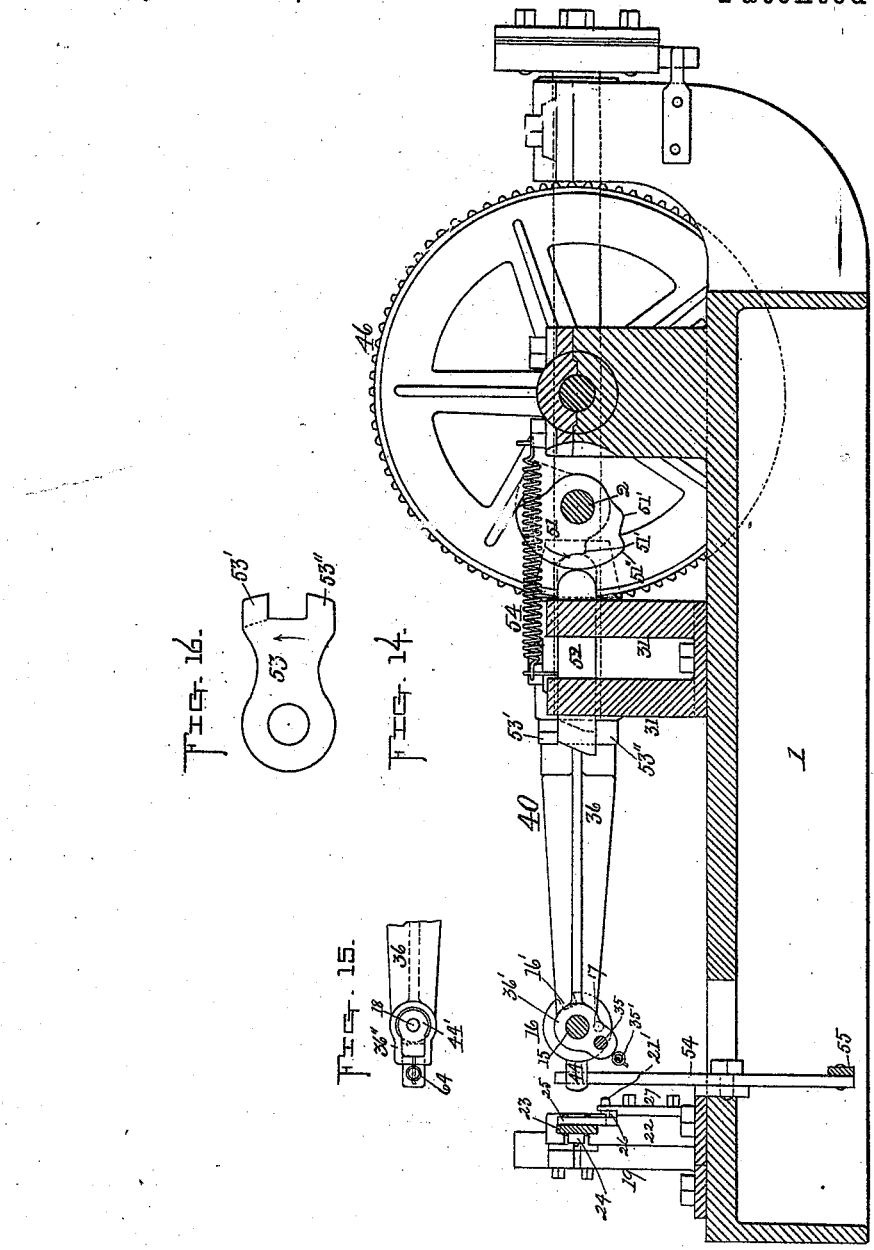

UNITED STATES PATENT OFFICE.

EDWIN S. LENOX AND LEROY COOK, OF WORCESTER, MASSACHUSETTS; SAID COOK ASSIGNOR TO THE WASHBURN & MOEN MANUFACTURING COMPANY, OF SAME PLACE.

MACHINE FOR MAKING WIRE BALE-TIES.

SPECIFICATION forming part of Letters Patent No. 362,452, dated May 3, 1887.

Application filed April 26, 1886. Serial No. 200,123. (No model.)

*To all whom it may concern:*

Be it known that we, EDWIN S. LENOX and LEROY COOK, both citizens of the United States, and residing at Worcester, in the county of Worcester and State of Massachusetts, have invented certain new and useful Improvements in Machines for Making Wire Bale-Ties; and we do hereby declare that the following is a full, clear, and exact description thereof, which, in connection with the drawings making a part of this specification, will enable others skilled in the art to which our invention belongs to make and use the same.

Our invention relates to power-machines for making wire bale-ties of the description shown in Fig. 2 of the drawings—that is, having at one end an eye made of three coils of the wire, the projecting end being intertwisted with the body of the tie and the other end of the tie being left free and straight, to be connected with the manufactured end in the manner, as fully set forth in Letters Patent No. 302,009, issued July 15, 1884, for said bale-tie. This bale-tie has heretofore been made on hand-machines.

Our invention consists in certain novel features of construction and mode of operation of a power-machine for making said tie, as will be hereinafter fully set forth and described, and the nature thereof indicated by the claims.

We prefer to have the wire from which the bale-ties are made first cut into suitable lengths before the end to be manufactured is inserted into the machine to be operated upon; but, if desired, a continuous wire may be fed into the machine and be cut off at the proper time by any well-known cutting mechanism.

Referring to the drawings, Figure 1 is a plan view of our machine, the slot at the lower edge of said figure being the point where the wire is fed in to be operated upon. Fig. 2 shows a plan and side view of the manufactured end of the bale-tie (full size) made by our machine, the other end (not shown) being left free and straight to be connected with the end shown by inserting it through the eye in the usual and well-known manner. Fig. 3 is an enlarged section on line A A, Fig. 1, looking in the direction of arrow *a*, same figure. Fig. 4 is a section on line B B, Fig. 1, looking in the direction of arrow *a*, same figure. Fig. 5 is a front view of the vise mechanism for holding the wires as they are twisted after the eye is formed, and located at the lower left-hand corner of Fig. 1, looking in the direction of arrow *a*, same figure. Fig. 5$^a$ represents detail views of a detached portion of the vise mechanism shown in Fig. 5, to be hereinafter described. Fig. 6 is a section on line B B, Fig. 1, looking in the direction of arrow *b*, same figure, being a rear view of the vise mechanism shown in Fig. 5, said mechanism being reversed around. Fig. 7 is an edge view of a detached part of the vise mechanism shown in Figs. 5 and 6, looking in the direction of arrow *c*, Fig. 5, or arrow *d*, Fig. 6. Fig. 7$^a$ is an edge or face view of the other part of the vise mechanism shown in Figs. 5 and 6, looking in the opposite direction from the view shown in Fig. 7. Fig. 8 is a cross-section on line C D, Fig. 1, looking in the direction of arrow *e*, same figure. Fig. 9 is a cross-section on line E E, Fig. 1, looking in the direction of arrow *e*, same figure. Fig. 10 is a section on line F F, Fig. 1, looking in the direction of arrow *e*, same figure. Fig. 11 is a section on line G, Fig. 1, looking in the direction of arrow *a*, same figure, showing the clutch arrangement or the manner of connecting the driving-pulley with the driving-shaft to operate the machine, only the hub of the pulley being shown in this figure. Fig. 11$^a$ is a plan and side view of the sliding key 9 of the clutch mechanism shown in Fig. 11, detached therefrom. Figs. 12 and 13 show an end and edge view, respectively, of the hub of the driving-pulley, showing the notches into which the sliding key enters to connect the driving-pulley with and to operate the main shaft of the machine. Fig. 14 is a cross-section on line H H, Fig. 1, looking in the direction of arrow *e*, same figure. Fig. 15 is a detached front view of the bale-tie push-off arrangement, looking in the direction of arrow *e*, Fig. 1, showing a detached part of the end of one of the arms of the revolving flier and the movable push-off secured thereon; and Fig. 16 shows a side view of the detached forked arm 53, an end view of which is shown in Fig. 14 and a top view in Fig. 1.

In the accompanying drawings, the part marked 1 is the bed-plate of the machine, supported upon suitable legs or supports. (Not shown in the drawings.) Upon said bed-plate 1 are arranged and supported the several parts of the machine, in the manner to be hereinafter fully described.

The part marked 2 is the main driving-shaft of the machine, supported and turning in bearings 3, secured upon the bed-plate 1. The driving-pulley 4, driven by belt or gear connection in any usual and well-known manner, is loose upon said shaft 2 and connected therewith, for operating the same, by means of the clutch arrangement shown in Figs. 9 and 11.

The part marked 5 is a movable slide supported in stand 6, having its upper part curved to conform to the curvilinear surface of the shaft 2, and its projecting end 5' beveled or pointed. Said slide 5 is connected with a rod, 8, which is operated by the attendant, by means of a treadle or any other well-known device, to draw down the slide 5 away from the shaft 2 and release the key 9, which fits into a slot in said shaft 2, and is forced, by means of the spring 10', into connection with the driving-pulley 4, the part 9' extending into one of the slots 11', made in the inner edge of the hub 4' of the driving-pulley 4, (see Figs. 12 and 13,) thus causing the main shaft and all the parts secured thereon to be operated by the revolution of said driving-pulley.

The machine shown in the drawings is designed to be operated intermittingly, for the purpose of giving the attendant an opportunity to place in position to be operated upon the plain wire after a complete bale-tie is made on said machine. One revolution of the main driving-shaft causes all the several parts of the machine to be operated and a complete bale-tie to be made. Therefore, immediately after the slide 5 is drawn down to allow the key or driving-pin 9 to connect with the driving-pulley 4 and the machine to be operated, it is released and allowed to return to its original position.

As the main shaft 2 revolves, the projecting knob 9" of the sliding key 9 comes in contact with the beveled point 5' of the slide 5, (see Fig. 11,) causing the key 9 to slide back into its original position and out of contact with the driving-pulley 4, thus stopping the machine and allowing the driving-pulley to turn loosely on the driving-shaft.

An enlargement of the driving-shaft 2, between the hub 4' of the driving-pulley 4 and the cam 10, is shown in Fig. 11. This is not essential, but is for the purpose of re-enforcing and supporting the knobs 9' and 9" of the key 9, which project out from the shaft 2, to be struck by the beveled point 5' of the slide 5 in the manner above described. The enlargement of the shaft 2 also prevents longitudinal motion of the driving-pulley 4, loose on said shaft.

It will be understood that the clutch mechanism shown in the drawings and above described is a well-known form of clutch mechanism now in general use, and we do not claim the same as our invention. Any other well-known form of clutch mechanism for connecting the driving-pulley with the driving-shaft to operate the machine intermittingly may be employed in lieu of that shown and described, if preferred.

The machine may be operated continuously, and the driving-pulley may be fast upon the driving-shaft and connected with belt-shipping mechanism of any ordinary construction.

A large cam, 10, is secured upon the driving-shaft 2 to turn with said shaft for the purpose of operating the coiling-spindle 11 to coil the eye of the bale-tie. The cam is shown in its proper position when at rest, (see Fig. 9,) and it revolves in the direction of the arrow and performs its work during the first part of its revolution, using a little less than one-quarter of its revolution for coiling the eye of the tie.

The coiling-spindle 11, for coiling the wire around the forming-pin 18, to be hereinafter described, to form the eye or loop at the end of the tie, is made in two parts, 15' and 15, coupled together by a tongue-and-fork joint. (See Figs. 1, 3, and 4.)

The part 15' of the coiling-spindle 11 is mounted in bearings upon the bed 1 of the machine, and said coiling-spindle 11 is operated or caused to revolve at the proper time by the cam 10, secured upon the driving-shaft 2, through the intervention of the rocking lever 12, (see Fig. 9), carrying a friction-roll, 12', at one end, adapted to travel in the groove cut in the side of said cam, 10, and provided with a sector-gear at the other end, driving the compound gearing connected with the coiling-spindle 11. Said compound gearing (fully shown in Figs. 1, 3, and 4) is made up of spur-gears 13, 13', and 13", used to multiply the motion of the sector-gear of the rocking lever 12, so as to obtain about two revolutions of the coiling-spindle 11.

The part 15 of the coiling-spindle 11 is mounted in the outer end, 36', of one arm, 36, of the flier 40, (see Figs. 1, 3, and 4), and is provided with a screw-thread adapted to engage with a screw-threaded hole in said end 36', so that the part 15 of the coiling-spindle 11 may have a longitudinal motion back and forth in its bearing.

Upon the outer end of the part 15 of the coiling-spindle 11 is secured a small disk, 16, provided with a pin or coiling-finger, 17, projecting out at right angles therefrom. Said coiling-finger 17 has a groove cut in the end thereof for holding the wire as it is coiled around the central forming-pin, 18, to be hereinafter described. (See Fig. 3.) As the coiling-finger 17 and disk 16 (secured upon the outer end of the coiling-spindle 11, operated in the manner above described) revolve in the act of coiling the wire around the forming-pin 18, they recede from said forming-pin, the screw-thread on the part 15 of the coiling-spindle 11 causing said part 15 to move out from its bearing 36', and thus the wire is coiled in a spiral form.

The two parts 15' and 15 of the coiling-spindle 11 are coupled together by a tongue-and-fork joint, 14, which consists of a tongue-piece, 14', extending out from the inner end of the part 15, and a slotted or forked head, 14", upon the end of the part 15'. The tongue 14' extends into the forked head 14", to form a connection between the parts 15' and 15 of the coiling-spindle 11 during the revolution of said coiling-spindle or the coiling operation, and said tongue is disconnected from the fork during the twisting operation, so as to allow the part 15, mounted in one arm of the flier, to revolve, while the part 15', mounted on the bed of the machine, remains stationary.

In Figs. 5, 6, and 7 are shown different views of the vise mechanism for holding the free end 38 of the wire in close contact with the main wire after the eye 37 is formed by the coiling spindle 11 in the manner above described.

The part marked 19 is the stand for holding the stationary steel plate 20, provided with a slot, 20', into which the wires are forced. It also contains the slide 21, which is forced up to bind and hold the wires in close contact, in the manner to be hereinafter fully described.

22 are the stands for supporting the forked slide 23. The piece 24, secured upon said slide 23, is to prevent the loose end 38 from bending outward during the twisting operation. The flattened end 24' presses against the loose end 38 and holds it in the slot 21' and in close contact with the main wire 39 during the twisting operation. The use of the piece 24 may be dispensed with, as the forked end of the slide 23 serves to hold the wires in the slot 21' in connection with the slide 21 during the twisting operation. A right-angled piece, 25, is secured to said slide to move forward with said slide, having a beveled point, 25', which, as the slide 23 moves forward, enters the open space 26 beneath the pin 21' on the slide 21 (see Fig. 7) and raises said slide 21, the pin 21' being held and guided by the slotted piece 27, secured to stand 19. Thus the wires are pressed by the slide 23 on one side and by the slide 21 on the under side, and are held securely during the entire operation of twisting, to be hereinafter described.

At the end of the coiling operation, to form the eye 38 at the end of the tie, the loose end 37 of the wire is left in front of the slot or opening 20'. It is then immediately brought into line with the main wire 39 of the tie, which extends through said slot 20', and is forced into close contact with it by the forked slide 23, and is held in place by the piece 24, in connection with the slide 21, operated by the right-angled piece 25 on said slide 23.

The forked slide 23 is operated by means of the lever 28, pivoted at 29, slide 30, supported in bearings 31, and cam 32, secured upon the driving-shaft 2. (See Figs. 1 and 8.) The short throw on cam 32 (see Fig. 8) forces forward the slide 30, which operates the lever 28, and this in turn carries forward the slide 23, against the end of which the end of lever 28 presses and causes the wires to be held in contact, in the manner above described, during one-half of a revolution of the cam 32, the spring 33, secured to the forked slide 23 and to the bed of the machine, serving to bring back the slide 23 and the lever 28 into their original positions at the end of the twisting operation.

A bent arm, 34, attached to forked slide 23, (see Figs. 1, 6, and 8,) is used to hold the slide 35, supported in the hub 36' at the end of one of the arms 36 of the revolving flier 40, in its back position during the coiling operation and the revolution of the disk 16. At the end of the coiling operation said arm 34 moves forward with the slide 23 and allows the slide or pin 35 to be drawn forward by a spring, 35', Fig. 4, and enter a slot, 16', (see Fig. 14,) cut in the disk 16, and lock said disk, and thus keep it in position and prevent it from turning while the twisting is going on, so that the tongue 14' will be held in a vertical position during the twisting operation, to allow of its freely passing through the fork 14" as the flier 40 revolves.

After the eye 37 of the tie is formed in the manner above described, and the loose end 38, extending out from the eye, is held in close contact with the main wire or body of the tie 39, by means of the vise mechanism before described, the twisting operation for twisting together the loose end 38 and the main wire 39 of the tie takes place.

The twisting device consists of a flier, 40, secured upon the end of a shaft, 41, which turns in bearings 42 upon the bed of the machine. Said flier 40 has a gage, 49, secured thereon for regulating the length of the wire to be coiled, and two arms, 36, projecting from its hub, at the outer end of each of which are small hubs 36' and 36".

The hub 36' is for holding the outer end, 15, of the coiling-spindle 11 and the locking-slide 35, above described, and the hub 36" is for holding the central forming-pin, 18, around which the end of the wire is coiled by means of the grooved coiling-pin 17, to form the eye of the tie, and is also for holding the push-off 44, the end of which, 44', encircles the pin 18, (see Fig. 15,) said push-off 44 being operated at the proper time to push off from pin 18 the manufactured end of the tie, by means of mechanisms, to be hereinafter described.

The flier 40 is driven by means of bevel-gears 45 and 46, which in turn are driven by the lock-gears 47 and 48, the lock-gear 48 being secured upon the driving-shaft 2, and having teeth only upon one-half of its circumference. One-half a revolution of lock-gear 48 produces one complete revolution of gear 47 and bevel-gear 46. This in turn produces five revolutions of bevel-gear 45 and of the flier 40, thus giving five complete twists to the wires, as shown in Fig. 2.

The large cam 10, (shown in Figs. 1 and 9,) for operating the coiling-spindle 11, is so constructed that the joint 14 stands with its tongue part 14' and forked part 14'' in a vertical position during the twisting operation. Thus the tongue passes through the fork unobstructed during each successive revolution of the flier 40. At the end of the fifth revolution of the flier the joint 14 must be exactly matched, in order to be in a right position for the coiling-spindle to be operated.

The lock-gears 47 and 48 cannot always be depended upon to accomplish this result. A half-revolution of the lock-gear 48 causes five complete revolutions of the flier 40, so that a very slight variation either way would prevent the joint 14 from being properly matched at the end of the fifth revolution. It has therefore been necessary to accomplish the exact matching of the joint 14 at the end of the fifth revolution of the flier 40, or at the end of the twisting operation, by means of a separate device, which will now be described. Said device consists of a cam, 51, secured upon the driving-shaft 2, a slide, 52, supported in standards 31, and a forked arm, 53, secured upon the shaft 41 of the flier 40 and revolving with said flier, (see Figs. 1, 14, and 16,) which is operated as follows: Immediately after the forked arm 53 has passed the end of the slide 52 on its last revolution, (the slide being drawn back and kept in its backward position by the coiled spring 54, secured to said slide and the frame of the machine during the twisting operation,) said slide 52 is forced forward a short distance by the first throw 51' of cam 51. The position of cam 51 and slide 52 at this instant is clearly shown by dotted lines, Fig. 14.

It will be readily seen that the position of the slide 52 is such as to allow one arm, 53', of the forked arm 53 to pass by said slide, the arm 53 revolving in the direction of arrow, Fig. 16, but not to allow the other arm, 53'', to pass, it being of twice the width or thickness of the arm 53'. In this manner the flier 40 is stopped at exactly the right time to have the tongue 14' match the fork 14'' of the joint 14; but another forward movement of the slide 52 is required to prevent the rebound of the forked arm 53 and of the flier 40. This is done by the second throw, 51'', on the cam 51, so that the parts will be in the position shown by full lines, Fig. 14, and the flier will be locked both ways at the proper time and prevented from moving in either direction.

When the twisting operation above described is completed, the eye 37 is pushed off the forming-pin 18 by means of the push-off 44, the end of which, 44', encircles the pin 18, as hereinbefore described. (See Fig. 15.)

The push-off 44 is supported in the hub 36'' of the arm 36, and is operated at the proper time to push off the completed tie by means of the lever 54, connected at its lower end by a link, 55, with the lower end of lever 56, which in turn is connected at its upper end by a link, 57, with one arm, 58', of the angle-lever 58, the other arm, 58'', of lever 58 being connected with a slide, 59, moving in bearings 60 on the bed of the machine. (See Figs. 1, 4, and 10.) Said slide 59 is forced forward at the right time by the cam 61, secured upon the end of the driving-shaft 2, and is drawn back after having moved the push-off forward through the system of levers and connecting parts by the spring 62. The push-off 44 is drawn back at the same time by the spring 64.

The operation of our bale-tie machine will be readily understood from the above description, in connection with the drawings, by those skilled in the art; and by referring to Fig. 1 a connected idea of the whole operation may be obtained. The several parts of the machine should be in substantially the positions shown in said figure. The plain wire from which the tie is to be made is first placed in position, with its end in contact with the gage 49, in line with the center of the flier-shaft 41. The wire rests in the groove at the end of the coiling-pin 17 and under the forming-pin 18, and also in the slot 20' in the stand 19 of the vise mechanism. (See Fig. 5.) The clutch-slide 5 is operated or drawn down by the attendant, allowing the key or driving-pin 9 on the driving-shaft 2 to connect with the driving-pulley 4, and the machine to be put into operation. The coiling of the wire to form the eye 37 immediately begins. The coiling-spindle 11, composed of the two parts 15' and 15, coupled together by a tongue-and-fork joint, 14, as above described, and carrying at its outer end a disk, 16, provided with a coiling-finger, 17, is operated by the cam 10, through sector-gear 12 and compound gearing 13, 13', and 13''. At the end of two and a half revolutions of the coiling-spindle 11, which is done by a little less than one-quarter revolution of the cam 10, the slide 23 is forced forward by the lever 28, connected with and operated by slide 30 and cam 32 on driving-shaft 2, and the loose end 38 of the wire is caught and held in contact with the main wire 39 of the tie. At the same time the right-angled piece 25 (see Fig. 6) has moved forward and lifted the slide 21, compressing and holding the two wires in the slot 20' of the plate 20. The bent arm 34, attached to the slide 23, has also moved forward with said slide 23, and allowed the slide or pin 35 to be drawn forward by the spring 35', to enter the slot 16' in the disk 16 and lock said disk. At this time the joint 14 is in a vertical position, and the twisting together of the free end 38 and the body of the tie begins, being accomplished by means of the flier 40, driven by bevel-gears 45 and 46, and they by lock-gears 47 and 48, gear 48 being secured upon driving-shaft 2. During the twisting operation the eye 37 is securely held on forming-pin 18, and is thus made to revolve with the flier 40. At the end of five revolutions of the flier 40 the twisting operation is completed and the sliding bar 52 is forced forward by cam 51 upon the driving-shaft 2, and the flier is locked in position by means of the forked arm 53, in the manner hereinbefore fully described. The bale-tie is now completed, and the manufactured end is immediately pushed off of the forming-pin 18 by the push-off 44, operated by the cam 61, secured upon the main shaft 2 through a system of levers and connecting parts, in the manner hereinbefore fully described. The manufactured end of the bale-tie being thus completed and pushed off, the coiling-spindle 11 runs back to its original position, forced back by the last backward throw on cam 10, and this completes one revolution of the driving-shaft 2.

The driving-shaft 2 is disconnected with the driving-pulley 4 at the end of each revolution by the clutch arrangement hereinbefore fully described, so that the machine operates intermittingly; but, if preferred, the driving-pulley may be fast upon the driving-shaft and the machine operated continuously, and the wire may be fed in automatically by any usual and well-known form of mechanism for feeding in wire.

Having described our machine for making wire bale-ties, what we claim as new, and desire to secure by a patent, is—

1. In a machine for making wire bale-ties, the combination, with the coiling mechanism for forming the eye on one end of the tie and the vise mechanism for holding the wires during the twisting operation, of a revolving flier to twist the wires together and mechanism for releasing the completed tie at the end of the twisting operation, and means for operating the several mechanisms in due order, substantially as set forth.

2. In a wire bale-tie machine, the coiling mechanism for forming the eye, the vise mechanism for holding the loose end of the wire in contact with the body of the tie, mechanism for locking the coiling-finger during the twisting operation, a revolving flier for twisting the wires together, a mechanism for locking the flier at the completion of the twisting operation, mechanism for releasing the manufactured end of the tie, and means for operating the several mechanisms in due order, substantially as set forth.

3. In a bale-tie machine, the combination, with a revolving flier, the forming-pin, and the coiler-finger mounted on said flier, the device which carries the coiling-finger being arranged to be engaged with and disengaged from the driving mechanism on the bed of the machine, of a locking mechanism adapted to stop the flier at a certain point at the completion of the twisting operation, for the purpose stated, substantially as set forth.

4. The combination, with the revolving flier for twisting together the wires, supporting in its outer ends a forming-pin, and a coiling-finger, of a push-off mechanism adapted to push off from the forming-pin the manufactured end of the tie, substantially as set forth.

5. The combination, with a revolving flier, the forming-pin, and the coiling-finger mounted on said flier, the device which carries the coiling-finger being arranged to be engaged with and disengaged from the driving mechanism on the bed of the machine, and a locking mechanism adapted to lock the flier, for the purpose stated, of a push-off mechanism adapted to release the manufactured end of the tie at the completion of the twisting operation, substantially as set forth.

6. The vise mechanism for holding the loose end of the wire in contact with the main wire during the twisting operation, consisting of a stationary plate and a vertically-movable slide, in combination with a horizontally-movable slide and means for operating said slides, substantially as set forth.

7. The combination, with a revolving flier, a forming-pin mounted thereon, and a locking mechanism adapted to lock the flier in a certain position at the end of the twisting operation, of a coiling-spindle made in two parts, one part carrying the coiling-finger and provided with a screw-thread mounted on the flier and the other part mounted on the bed of the machine, said parts being coupled together by a tongue-and-fork joint, whereby they are connected together for coiling and disconnected for twisting, substantially as set forth.

8. The combination, with a revolving flier and a forming-pin mounted thereon, of a coiling-spindle made in two parts, one of which, carrying the coiling-finger, is mounted on the flier and the other on the bed of the machine, and coupled together by a tongue-and-fork joint, for the purpose stated, substantially as set forth.

9. The combination, with a revolving flier for twisting the wires together and a forming-pin mounted in one arm of said flier, around which the wire is coiled, of the outer end of a jointed coiling-spindle carrying a coiling-finger coupled to the inner end of said spindle by a tongue-and-fork joint and mounted on the other arm of said flier and provided with a screw-thread adapted to engage with a screw-threaded hole in said flier-arm, for the purpose stated, substantially as set forth.

10. The combination, with a coiling-spindle made in two parts, coupled together by a tongue-and-fork joint, the outer part of said spindle being mounted in one arm of a revolving flier and carrying a slotted disk provided with a coiling-finger at its outer end, and a forming-pin mounted on said flier, of a sliding key mounted on said arm of the flier and adapted to engage with said slotted disk at the proper time to lock said outer end of said coiling-spindle in such a position that the tongue can pass freely through the fork at the point where the two parts of said spindle are coupled together during the twisting operation, substantially as set forth.

11. The combination, with a flier, 40, and forming-pin 18, supported in one of its arms, of the coiling-spindle 11, made in two parts, coupled together by a tongue-and-fork joint, the outer end, 15, carrying a coiling-finger, 17, and mounted in the other arm of said flier and adapted to be disconnected from the part 15' of said coiling-spindle during the twisting operation, substantially as set forth.

12. The combination, with one arm of the flier 40, provided with a screw-threaded hole at its outer end, 36', and a forming-pin mounted in the other arm of said flier, of the outer end, 15, of the jointed coiling-spindle 11, carrying a coiling-finger and provided with a screw-thread and mounted in and adapted to engage the threaded hole in said end 36', for the purpose of giving longitudinal motion to said coiling-finger during the coiling operation, substantially as set forth.

13. The combination, with the outer end, 15, of the jointed coiling-spindle 11, mounted in one arm of a revolving flier and provided with the slotted disk 16 and coiling-finger 17, and a forming-pin, 18, mounted in the other arm of said flier, of the sliding key 35, mounted in said first-mentioned arm of the flier and adapted to engage with said slotted disk to lock said outer end, 15, of the coiling-spindle 11 during the twisting operation, for the purpose stated, substantially as set forth.

14. In the vise mechanism for holding the wires during the twisting operation, the combination, with a stand for supporting a stationary plate, 20, and a vertical sliding plate, 21, of a stand supporting a horizontal sliding plate, 23, carrying an arm, 25, adapted to engage with said plate 21, to operate the same at the proper time for the purpose of bringing the projecting end of the wire in contact with the main wire and holding the same during the twisting operation, substantially as set forth.

15. In the mechanism for locking the revolving flier, to stop the same in the proper position at the completion of the twisting operation, the combination, with the slotted arm 53, secured upon the spindle of said flier, of a slide, 52, suitably supported, and a cam, 51, secured upon the driving-shaft to operate said slide and cause its forward end to engage with said slotted arm 53 at the proper time to lock the flier, substantially as set forth.

16. The combination, with the outer end of one arm, as 36'', of the flier 40, carrying a forming-pin, 18, of the sliding push-off 44, mounted in said arm of the flier and adapted to push the looped end of the tie from the pin 18, and means for operating said push-off, consisting of a cam secured upon the driving-shaft and a system of pivoted levers and connecting-arms intervening between said cam and push-off, substantially as set forth.

17. The combination, with the driving-shaft, cam 10, secured thereon, and pivoted angle sector-arm 12, provided with a roll at one end to engage with said cam 10 and a sector-gear at the other end to engage with a pinion to operate the coiling-spindle, of said coiling-spindle, made in two parts connected together by a tongue-and-fork joint, substantially as set forth.

18. In the mechanism for operating the sliding jaw 23 of the vise mechanism, the combination, with driving-shaft 2 and cam 32, secured thereon, of slide 30 and pivoted lever 28, intervening between and connecting said slide 30 with the sliding jaw 23, to operate said jaw at the proper time, substantially as set forth.

19. The combination, with flier 40, carrying a forming-pin, 18, and push-off 44, mounted in one of its arms, and the outer end of a jointed coiling-spindle provided with a coiling-finger mounted in its other arm, of means for revolving said flier, consisting of bevel-gears 45 and 46 and lock-gears 47 and 48, said gear 48 being secured on the driving-shaft, substantially as set forth.

EDWIN S. LENOX.
LEROY COOK.

Witnesses:
JOHN C. DEWEY,
FRED. W. SMITH.